June 27, 1967 A. L. MARKS 3,328,158
PROCESS FOR MANUFACTURING ORGANIC FERTILIZER
CONTAINING WATER SOLUBLE NITROGEN
FROM HUMIC MATERIALS
Filed March 6, 1964
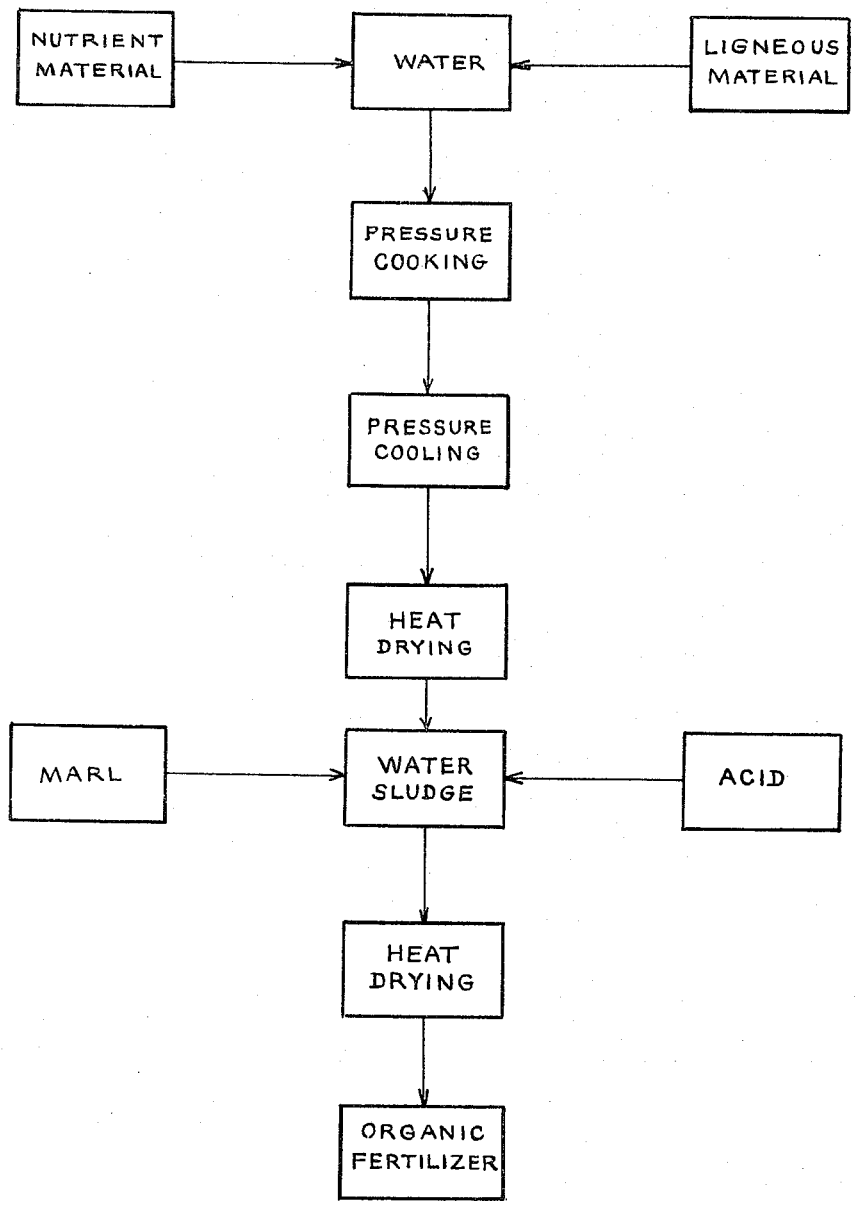
INVENTOR.
ALFRED LIND MARKS
BY Edward C. Threedy
HIS ATTORNEY.

United States Patent Office 3,328,158
Patented June 27, 1967

3,328,158
PROCESS FOR MANUFACTURING ORGANIC FERTILIZERS CONTAINING WATER SOLUBLE NITROGEN FROM HUMIC MATERIALS
Alfred Lind Marks, 829 N. Wheaton Ave., Wheaton, Ill. 60187
Filed Mar. 6, 1964, Ser. No. 350,088
2 Claims. (Cl. 71—24)

My invention relates to a new and useful improvement in a process for manufacturing organic fertilizer.

A principal object of my improved process for manufacturing an organic fertilizer is in the novel combination of ingredients and steps of processing the same without a material loss of nutrients from the raw material state to the finished product.

A further object of my improved process is in composing an organic fertilizer wherein the nitrogen content up to 30% will be obtained and where the humic material will absorb the desired nutrients and does not act merely as a carrier for the same.

Yet another object of my improved process is to produce an organic fertilizer which will weigh approximately 18 to 40 lbs. per cubic foot compared to the present day so-called light weight fertilizers which weigh approximately 30 to 40 lbs. per cubic foot and 80 lbs. per cubic foot for ordinary organic fertilizers.

The single drawing, forming a part of this application, is a flow sheet of the improved process.

In the practice of my improved process for manufacturing an organic fertilizer, the first step requires combining a nutrient material such as ammonia, phosphoric acid, and potassium hydroxide with a ligneous component containing a readily soluble humic acid, such as peat, with an equal weight of water. The weight of the nutrient material is based upon the total material weight in its anhydrous state. The mixed ingredients are then solubilized by a pressurized cooking process while the mixture is preferably under pressure for 40 minutes at a temperature approximately 220° to 250° F., it being readily understood that the time, temperature and pressure can vary in ratio with respect to each other so as to arrive at the identical solubilized results as specifically set forth without departing from the disclosure of this second step.

A further step consists of cooling the material while it remains under pressure to a temperature of 180° F. This cooling process may be by a natural removal from the cooking element or more readily achieved through a centrifugally cooling action. The cooled composition is then dried at a temperature not to exceed 160° F. resulting in a product which contains 100% soluble and available nutrient materials, which available nutrients are equal in volume to that of the separate pre-treated materials.

After the material has been cooled as set forth above, there is added marl or other calcium-magnesium containing material in the amount of 40% of the original anhydrous weight of the nutrient and ligneous ingredients. After proper mixing, an acid solution is added such as nitric acid and phosphoric acid in an amount equivalent to 3% of the original weight of the cooked and dried composition to maintain the acidity content at no more than a pH of 4. The addition of 40% marl produces a weight per cubic foot of approximately 18 lbs.

To this mixture add sufficient water to form a sludge. The sludged material is then dried under temperature, not exceeding 160° F. with the resulting composition of material produced being approximately 90% insoluble as to nitrogen, yet 90% available, and 90% to 100% equal in volume to the sum of the combined volume of the separate nutrient ingredients.

By following the above steps an organic fertilizer is achieved which has its nitrogen level raised to approximately 30% capacity. The natural nutrients of each of the separate elements are retained during the processing and the humic material is actually instilled with the nutrients, rather than merely acting as a carrier therefor as in other present day organic fertilizers claiming to have equal nutrient value.

By practicing my improved process, the nutrient materials will have a pH of 7 or less, and the insoluble material has a pH of 4 or less when dried to less than 5% of its total moisture content. The required temperature range for cooking is comparatively low.

The various advantages and object of my invention may be accomplished by modifications of the particular method and embodiment specifically described herein and it is intended that the appended claims should include all equivalent arrangements and methods coming within their call.

Having thus described my invention, what I claim as new and desire to protect by Letters Patent is:

1. A process for making a light-weight organic fertilizer comprising the steps of combining nutrient ingredients and soluble ligneous materials with water in an amount equal in weight to the total anhydrous weight of the combined ingredients, cooking the mass at a temperature of approximately 220° F. to 250° F. under 10 to 15 pounds pressure for approximately 40 minutes, maintaining less than a pH of 7, cooling the material to 180° F. while under pressure, depressurizing and drying the mass, adding to the resulting mass a marl in the amount of 40% of the original weight of the combined nutrient and ligneous materials, adding an acid solution to reduce the pH to 4, adding water to the mass in an amount to create a sludge, then dehydrating the sludged mass by applying a temperature of 160° F. so that the resulting dried fertilizer contains less than 5% moisture.

2. A process for making a light-weight organic fertilizer comprising the steps of combining nutrient ingredients and ligneous materials, which contain soluble humic acid, such as peat, with water in an amount equal in weight to the total anhydrous weight of the combined ingredients, cooking the mass at a temperature of approximately 220° F. to 250° F. under 10 to 15 pounds pressure for approximately 40 minutes, maintaining less than a pH 7 in the resulting mass, cooling the material to 180° F. while under pressure, de-pressurizing the mass, adding to the resulting mass a marl such as equal parts of calcium and magnesium in the amount of 40% of the original weight of the combined nutrient and peat, adding an acid solution in the amount of 3% of the weight of the cooked and dried mass, adding water to the mass in an amount to create a sludge for mixing the same, dehydrating the sludged mass by applying a temperature of 160° F. so that the resulting dried fertilizer contains less than 5% moisture.

References Cited

UNITED STATES PATENTS

| | | | |
|---|---|---|---|
| 23,467 | 4/1859 | Hyde | 71—24 |
| 2,027,766 | 1/1936 | Davis et al. | 71—24 |
| 2,150,164 | 3/1939 | Heath et al. | 71—23 |
| 2,881,066 | 4/1959 | Sproull et al. | 71—23 X |
| 2,946,675 | 6/1960 | Davey et al. | 71—23 X |

DONALL H. SYLVESTER, *Primary Examiner.*

R. BAJEFSKY, *Assistant Examiner.*